Nov. 15, 1966   W. A. CROWLEY   3,285,535
GROUND EFFECT MACHINE
Filed Aug. 26, 1964   2 Sheets-Sheet 1
FIG___1
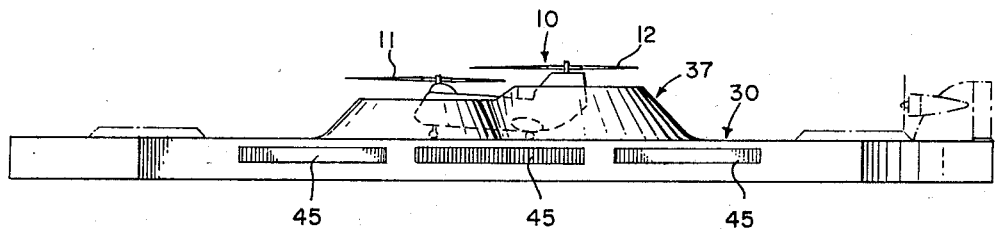
FIG___2
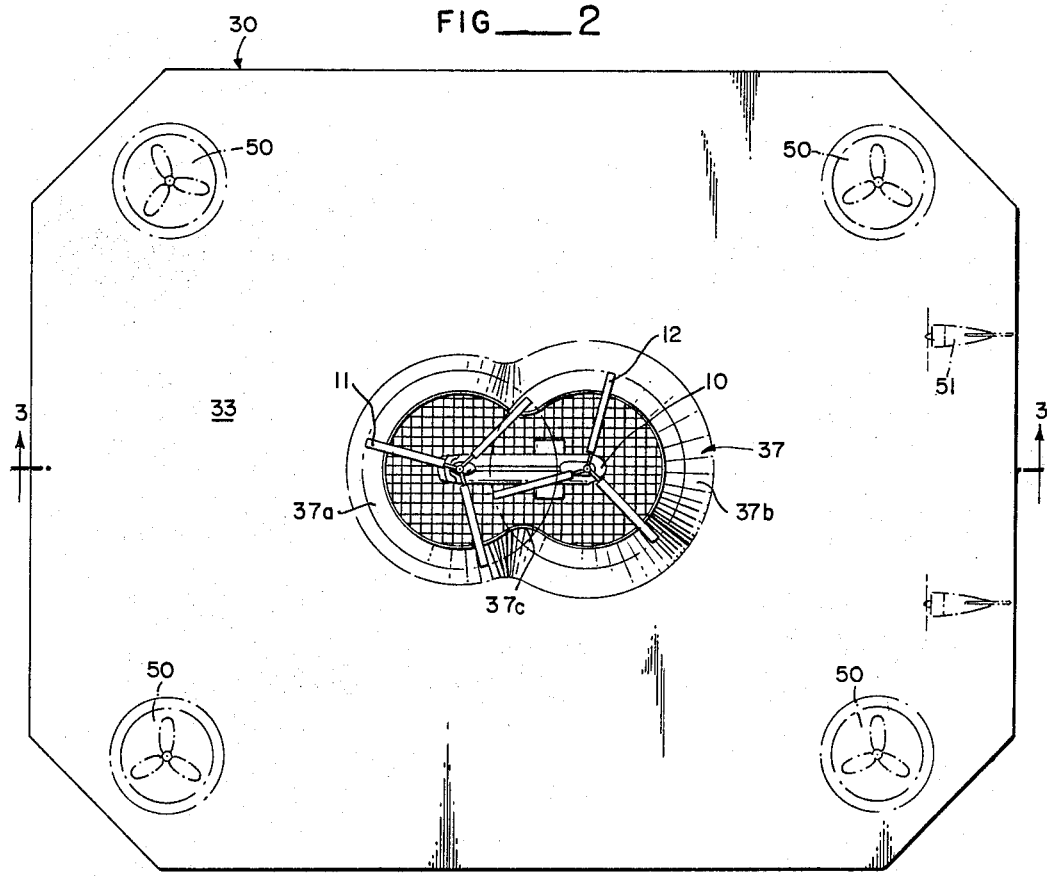
WALTER A. CROWLEY
*INVENTOR.*
BY *Seed & Berry*
ATTORNEYS Nov. 15, 1966   W. A. CROWLEY   3,285,535
GROUND EFFECT MACHINE
Filed Aug. 26, 1964   2 Sheets-Sheet 2
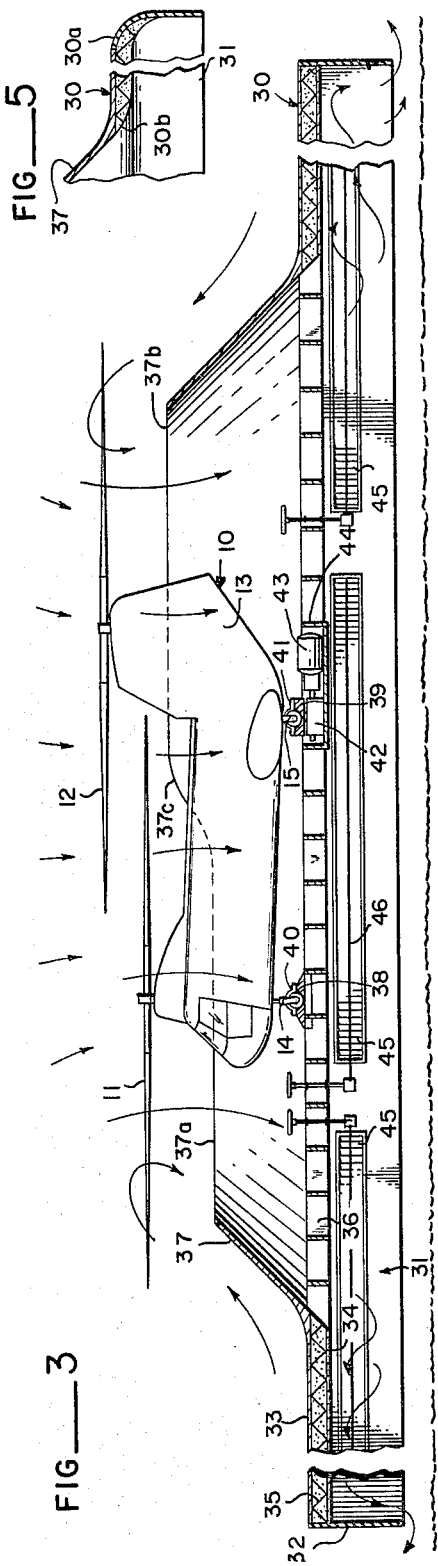
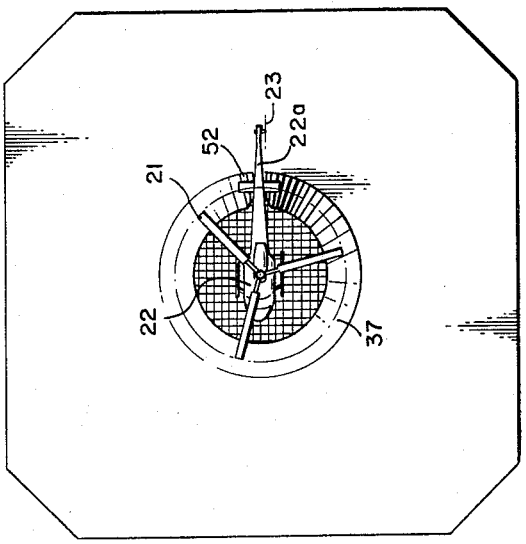
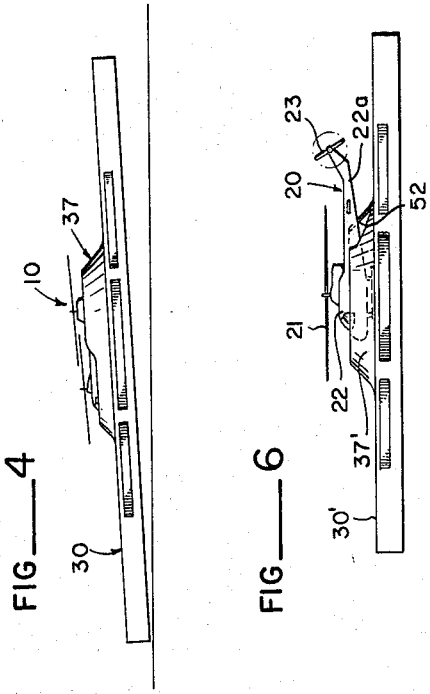
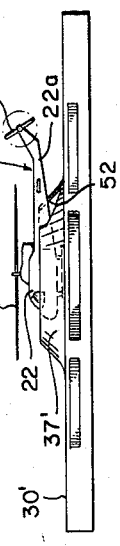
WALTER A. CROWLEY
INVENTOR.
BY
ATTORNEYS

United States Patent Office 3,285,535
Patented Nov. 15, 1966

3,285,535
GROUND EFFECT MACHINE
Walter A. Crowley, 9710 45th NE., Seattle, Wash.
Filed Aug. 26, 1964, Ser. No. 392,100
10 Claims. (Cl. 244—2)

The present invention relates generally to an improved ground effect machine (G.E.M.) in which an air cushion platform is associated with a mobile source of pressurized gas, and particularly with a helicopter or other vertical takeoff aircraft in such a manner that the downwash from the aircraft is utilized to create the lifting pressure beneath the platform.

A principal object of the invention is to provide a system by which a self-sufficient aircraft can be used to transport, above the ground or water surface, a personnel and/or cargo platform carrying a load considerably in excess of the load carrying capacity of the aircraft by itself.

The invention also aims to provide such a system by which a single aircraft or other mobile fan unit can be utilized to air shuttle multiple such carrier platforms one at a time, between stations in a manner analogous to the use of a tug for barges or a truck for trailers.

A further object is to provide such a system in which the loading or unloading stations can be either on land or on water.

Other objects of the invention are to provide such a system in which the carrier platforms can be of simple and economical construction, and in which the aircraft or other mobile source of pressurized air can be quickly and easily connected to and disconnected from the platforms.

Still another object is to provide an improved fan and air intake duct arrangement for a ground effect machine giving greater operating effectiveness and efficiencies.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 1 is a side elevational view of a ground effect machine embodying the present invention and utilizing, for purposes of example, a tandem rotor helicopter.

FIG. 2 is a top plan view of the machine.

FIG. 3 is an enlarged fragmentary vertical sectional view taken along the line 3—3 of FIG. 2.

FIG. 4 is an elevational semi-schematic view showing the machine in flight position tilted for forward propulsion.

FIG. 5 is a detail sectional view of a modified platform and duct configuration.

FIG. 6 is a side elevational view of a modified machine illustrating the use of a single rotor helicopter; and FIG. 7 is a top plan view of the modified machine of FIG. 6.

The present invention involves my discovery that a diffuser, when placed in the downwash of a fan with the smaller end of the diffuser nearest the fan, can be made to trap all of the downwash air volume and pressure and in addition will cause an induced air flow over the outside of the diffuser and thence into the diffuser. Best results are achieved when each of the fan blades projects by its tip radially beyond the diffuser in axially spaced relation thereto such that the vortex zone near the top of the blade is interrupted by the upper end of the diffuser. The diffuser may take the form of a frustro-conical duct having a slope of about forty-five degrees.

In accordance with the present invention this diffuser-fan discovery is utilized to supply the air pressure and air volume to lift and propel an air cushion platform which is preferably of the simple plenum type, but may be of the annular-jet or other types well-known in the G.E.M. art. A further concept of the invention is the utilization of a self-propelled mobile fan unit which can move from one diffuser-equipped air cushion platform to another so as to serve as the air lift and air propulsion source for multiple air cushion platforms. The mobile fan unit may take the form of a fan-carrying land or amphibious truck adapted to be driven from one such platform to another and position the fan over the diffuser of the selected platform, or may comprise a helicopter or other suitable vertical take-off aircraft.

In the case of a helicopter its rotor is utilized as the fan, and so the helicopter body is positioned within the diffuser to properly locate the helicopter rotor above the mouth of the diffuser. In the instance of a truck providing the fan, the truck body may be given sufficient ground clearance in the region of the fan to permit the truck body to straddle the diffuser when the fan is centered over the diffuser, or the fan may be cantilevered from the truck body to reach over the diffuser.

Referring to the accompanying drawings it is seen that for purposes of example helicopters have been illustrated as the mobile fan unit. In the example shown in FIGURES 1–4 the helicopter is a tandem rotor unit 10 such, for example, as the "Vertol 107" or "Vertol HC–1B Chinook" produced by the Vertol Division of the Boeing Company. On such a craft the counter-rotating rotors 11–12 may be tilted forwardly simultaneously relative to the body 13 for forward thrust, and may be selectively tilted to one side or opposite sides of the craft steering. The helicopter 20 in the other example illustrated in FIGURES 6–7 is of the type having a single tiltable lift rotor 21 in which case the helicopter body 22 is formed with a projecting tail 22a for carrying a yaw control rotor 23. These two examples of helicopters are by way of illustration only, as other types of helicopters, for instance one having a pair of coaxial counter-rotating rotors, can also be used.

Directing attention to FIG. 3, it is seen that the air cushion platform is numbered 30 and has a bottom opening plenum chamber 31 which is surrounded by a skirt 32 depending from the platform proper. The platform is of suitable lightweight construction having vertically spaced decking and bottom skins 33–34 supported by a suitable trusswork 35. For buoyancy the void between the skins 33–34 is preferably filled with a closed-cell cellular material such as foamed plastic or with a honeycombed core material. At the center of the platform there is formed a bilobated center opening bridged by an open-mesh rigid grating 36 which is connected to the trusswork 35. A bilobated diffuser 37 projects upwardly from the rim of the grating 36 with the walls of the diffuser sloping inwardly at about forty-five degrees. The upper edge of the diffuser is stepped in conformance with the difference in level between the rotors 11–12 of the helicopter. Hence, the upper edge 37a of the front lobe of the diffuser is at a lower level than the upper edge 37b of the rear lobe, the junctures between the ends of the lobes being defined by sloped upper edge portions 37c.

The grating 36 is provided with front and back wheel wells 38–39 for receiving the front and back landing wheel assemblies 14–15 of the helicopter. Tie-down straps 40–41 are provided for holding the wheel assemblies in the wells. It will be noted that the rear well 39 may be vertically adjusted relative to the platform by a jack 42 powered by a motor 43 mounted in a recess 44. The grating 36 not only serves to support the helicopter but also acts as a catwalk and a duct reinforcement.

In addition the grating prevents air vortices within the duct and increases overall diffuser efficiency.

It will be noted that the skirt is provided with multiple sets of louvers 45 which are adapted to be opened and closed by actuation of a respective push-pull rod 46 pivotally connected to each of the louvers. This rod may be actuated by a manually or motorized rack and pinion mechanism. The purpose of the louvers 45 is to vent the plenum chamber 31 when it is desired to land the helicopter on the platform or to fly the helicopter off of the platform. Otherwise the platform would lift from the ground or water as the helicopter was landing or taking off. While the helicopter is being used in conjunction with the platform as a ground effect machine the louvers are normally kept in closed position. The louvers may also be selectively opened to provide additional steering thrust for special conditions. Instead of, or in addition to, the louvers in the skirt for venting the plenum, the deck may be provided with vent openings equipped with suitable doors. If desired, the portion of the skirt below the louvers may be of flexible material to add obstacle clearance.

In operation the platform 30 may be loaded with cargo and/or personnel either on land or water with conventional loading equipment. Multiple anchor points for tie-down are provided on the deck in the conventional manner. This loading can be performed while the helicopter is in use as the fan for another platform or is being flown independently. Then when the platform is loaded the helicopter can be landed to power it.

For take-off of the platform and helicopter as a G.E.M. unit the helicopter pilot operates the rotor controls as for normal helicopter take-off in which case the downwash from the rotors 11–12 is directed into the mouth of the diffuser duct 37. The tip portion of the rotor blades radially overhangs the upper rim of the duct approximately the same distance as the blades are spaced above the diffuser rim, and superior results are achieved when this distance is between one-tenth and two-tenths of the radius of the rotors. With this arrangement the upper edge of the diffuser interrupts the rotor tip vortex. As a result air is drawn upwardly along the outer face of the diffuser and into the upper end thereof. This educed air adds to the volume of air downwashing directly from the rotors and thereby gives increased air volume for lift of the platform.

The platform is lifted by a force equal to the average pressure of air in the plenum chamber times the effective horizontal area of the chamber, the floor of the chamber being the ground or water surface over which the platform is located. Air within the plenum chamber escapes through the gap between the ground (or water) and the lower edge of the skirt. The altitude of the machine above the ground is a function of the volume of air entering the chamber through the diffuser from the helicopter downwash and the air educed as explained above.

Thus, it is seen that by the present invention the average rotor disc pressure of the helicopter, instead of acting only on the rotor disc, acts on the roof of the entire plenum chamber. Furthermore, since the velocity of the downwashing air entering the plenum chamber is slowed down by the combined diffusing action of the diffuser and plenum chamber before escape of the air from beneath the skirt, the static lift pressure in the chamber is increased substantially over that of the average rotor disc pressure. Accordingly, since the platform area is considerably greater than the rotor disc area, and the static lift pressure in the chamber is greater than the average rotor disc pressure, the combined lift capacity of the helicopter and platform as a G.E.M. is many times that of the helicopter alone.

After the G.E.M. of the present invention has become airborne, the pilot tilts the helicopter rotors forwardly in the conventional manner for forward propulsion of the helicopter, and as a result the axis of flow of the downwashing air is correspondingly inclined. As a result there is a rearward flow component created which causes the static pressure in the rear of the plenum chamber to increase, thereby tilting up the rear of the machine as indicated in somewhat exaggerated form schematically in FIG. 5. Accordingly, in actual practice the tilt angle of the platform will become greater relative to the horizontal than the tilt angle of the rotor relative to the platform. The increased air escape area under the rear skirt of the machine produces a forward reaction thrust to propel the machine forwardly. This thrust is considerably greater than the horizontal thrust component of the tilted helicopter rotors.

Similarly, for steering lateral thrust can be created by tilting the rotors differentially in which case a thrust couple is created, not only at the rotor centers, but at respective diagonally opposite corner portions of the platform. For example, if the disc (sweep area) of the forward rotor 11 is tilted downwardly to the right and the disc of the rear rotor 12 is tilted downwardly to the left, as conventional for a right turn of the helicopter when flying alone, the pressure in the plenum chamber at the left front corner portion and right rear corner portion are responsively increased. Consequently there is increased velocity of the air escaping at these corners thereby giving a reaction thrust couple causing a right turn. This couple has several times the moment arm of the rotor thrust couple, and hence becomes the dominate steering force.

For braking the machine, the helicopter rotors are tilted rearwardly in the conventional manner for braking or reversing sole helicopter flight, and as a consequence the front of the helicopter is responsively raised. This increases the air escapeway beneath the skirt at the front of the platform and hence increases the reaction thrust at the front relative to that at the rear. Consequently, the platform is braked, and in fact, can be maneuvered backwards if desired.

For very large platforms or extreme loads the helicopter downwash can be supplemented by fan and diffuser units 50 permanently mounted on the platform. Also, the steering and propulsion of the machine can be supplemented by tail fans 51 adapted to be swung from side to side. It is also recognized that several diffusers and helicopters can be used on a single platform. The platform can take a great variety of shapes in plan view, those shown in FIGURES 2 and 7 being by way of example only. Slightly improved performance can be accomplished by rounding the upper edges 30a of the platform and the inner bottom edge 30b of the diffuser as indicated in FIG. 5.

Referring to FIGURES 6 and 7, the air cushion platform 30' can be constructed in the manner above described. Centered in the platform is a frustro-conical diffuser 37' which has a rear cutout 52 therein for the passage of the tail 22a of the single rotor helicopter 20. A grating is provided at the bottom of the diffuser as on the platform 30. Control of the modified machine is performed by the single helicopter rotor 21 in substantially the same manner as for the tandem rotor helicopter 10.

It is believed that the invention will have been clearly understood from the foregoing detailed description of my now-preferred illustrated embodiments. Changes in the details of construction may be resorted to without departing from the spirit of the invention and it is accordingly my intention that no limitations be implied and that the hereto annexed claims be given the broadest interpretation to which the employed language fairly admits.

What I claim is:

1. In combination, an air cushion platform having an air intake diffuser with its smaller end at the top of the platform, said platform being adapted to be lifted by the ground reaction of air forced downwardly through said diffuser, a helicopter having a body of a size adapted to enter said diffuser through the top thereof and having lifting rotor means for said body adapted to drive a stream of air downwardly, said helicopter being adapted to fly independently of said platform, and means for positioning the body of said helicopter in said diffuser with said lifting rotor means surmounting the top of said diffuser so that the air stream from the lifting rotor means enters said diffuser whereby said platform and helicopter collectively can become air borne as a ground effect machine.

2. The combination of claim 1 in which said helicopter body has a tail which projects radially beyond said diffuser above said platform when said body is positioned in said diffuser, and yaw control means on said tail for yaw control of the helicopter when it is flown independently of said platform and for yaw control when said helicopter and platform are collectively flown as a ground effect machine.

3. The combination of claim 1 in which said lifting rotor means comprises a pair of axially spaced contra-rotating lift rotors, one higher than the other, and with overlapping tracks, said diffuser being bilobated with each diffuser lobe centered beneath the track of a respective of said rotors.

4. The combination of claim 3 in which the upper rim of the diffuser lobe which is directly beneath the higher of said lift rotors is higher than the rim of the other diffuser lobe.

5. The combination of claim 3 in which the upper rim of each diffuser lobe has a respective radius less than that of the track of the respective lift rotor and is arranged such that the vortex zone near the tips of the blades of the respective lift rotor is interrupted by the upper end of the diffuser.

6. In combination, a platform having an air cushion plenum and a diffuser to said plenum with its smaller end uppermost, a helicopter mount on said platform near the lower end of said diffuser, said platform being adapted to be lifted by pressure created beneath the platform from air forced downwardly through said diffuser, a helicopter having a body of a size adapted to enter said diffuser through the top thereof and having lifting rotor means for said body adapted to drive a stream of air downwardly, said helicopter being adapted to fly independently of said platform, and means for positioning the body of said helicopter in said diffuser on said mount with said lifting rotor means arranged to direct an air stream downwardly through said diffuser into said plenum whereby said platform and helicopter collectively can become air borne as a ground effect machine.

7. The combination of claim 6 in which said lifting rotor means includes rotary blades spaced slightly above the top of said diffuser and each projecting by its tip radially beyond the upper edge of the diffuser such that the vortex zone near the tip of the blade is interrupted by the upper end of the diffuser.

8. The combination of claim 6 in which venting means is provided on said platform for selectively dumping said plenum.

9. The combination of claim 6 in which said helicopter mount comprises an open-mesh grate traversing the lower part of said duct.

10. In combination, an air cushion platform having an air intake diffuser, a fan upstream of said diffuser and having its blades each projecting by its tip radially beyond the upper edge of the diffuser such that the vortex zone near the tip of the blade is interrupted by the upper end of the diffuser.

References Cited by the Examiner

UNITED STATES PATENTS

| | | | |
|---|---|---|---|
| 1,191,501 | 7/1916 | Dees | 244—23 X |
| 3,090,455 | 5/1963 | Crowley | 180—7 |
| 3,103,327 | 9/1963 | Parry | 244—23 X |
| 3,150,731 | 9/1964 | Franklin et al. | 180—7 |
| 3,164,911 | 1/1965 | Vaughen | 180—7 |
| 3,175,785 | 3/1965 | De Tore et al. | 244—17.11 |
| 3,211,124 | 10/1965 | Mantle | 180—7 |

MILTON BUCHLER, *Primary Examiner.*

R. G. BESHA, T. MAJOR, *Assistant Examiners.*